US012620630B2

(12) United States Patent
Tanaka et al.

(10) Patent No.: US 12,620,630 B2
(45) Date of Patent: May 5, 2026

(54) ALL-SOLID-STATE BATTERY

(71) Applicant: TDK CORPORATION, Tokyo (JP)

(72) Inventors: Teiichi Tanaka, Tokyo (JP); Takeo Tsukada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 789 days.

(21) Appl. No.: 17/765,367

(22) PCT Filed: Sep. 29, 2020

(86) PCT No.: PCT/JP2020/036864
§ 371 (c)(1),
(2) Date: Mar. 30, 2022

(87) PCT Pub. No.: WO2021/079698
PCT Pub. Date: Apr. 29, 2021

(65) Prior Publication Data
US 2022/0344720 A1     Oct. 27, 2022

(30) Foreign Application Priority Data
Oct. 23, 2019     (JP) ................................. 2019-192583

(51) Int. Cl.
H01M 10/0585 (2010.01)
H01M 4/02 (2006.01)
(Continued)

(52) U.S. Cl.
CPC ......... H01M 10/0585 (2013.01); H01M 4/13 (2013.01); H01M 10/0562 (2013.01); H01M 2004/021 (2013.01)

(58) Field of Classification Search
CPC ............... H01M 10/0585; H01M 4/13; H01M 10/0562; H01M 2004/021
See application file for complete search history.

(56) References Cited

U.S. PATENT DOCUMENTS

2012/0115028 A1     5/2012   Ueno et al.
2012/0264021 A1     10/2012   Sugiura et al.
(Continued)

FOREIGN PATENT DOCUMENTS

CN          110970668 B   * 10/2021   ............ H01M 4/131
JP          2007-141573 A     6/2007
(Continued)

OTHER PUBLICATIONS

CN-110970668-B—Machine Translation (Year: 2020).*
(Continued)

*Primary Examiner* — Brian R Ohara
*Assistant Examiner* — Patrick Marshall Greene
(74) *Attorney, Agent, or Firm* — OLIFF PLC.

(57)          ABSTRACT

This all-solid-state battery includes a positive electrode layer, a negative electrode layer, and a solid electrolyte layer positioned between the positive electrode layer and the negative electrode layer, the positive electrode layer includes a positive electrode current collector and a positive electrode active material layer which is in contact with the positive electrode current collector, the negative electrode layer includes a negative electrode current collector and a negative electrode active material layer which is in contact with the negative electrode current collector, at least one of the positive electrode active material layer and the negative electrode active material layer has a plurality of voids therein, and the plurality of voids include an anisotropic void in which an aspect ratio obtained by dividing a length in a major axis direction by a length in a minor axis direction is 2 or more and 29 or less.

7 Claims, 3 Drawing Sheets

(51) Int. Cl.
  *H01M 4/13*        (2010.01)
  *H01M 10/0562*    (2010.01)

(56)                References Cited

U.S. PATENT DOCUMENTS

| | | | |
|---|---|---|---|
| 2021/0050621 A1 | 2/2021 | Woehrle | |
| 2021/0057781 A1 | 2/2021 | Tomizawa et al. | |
| 2021/0167417 A1 | 6/2021 | Chao et al. | |
| 2021/0194040 A1* | 6/2021 | Yasuda | H01M 4/0423 |
| 2021/0202929 A1* | 7/2021 | Yura | H01M 10/0569 |
| 2022/0093910 A1* | 3/2022 | Lan | H01M 10/054 |
| 2022/0094027 A1* | 3/2022 | Lee | H01M 4/1395 |
| 2022/0140386 A1 | 5/2022 | Masuko et al. | |

FOREIGN PATENT DOCUMENTS

| | | |
|---|---|---|
| JP | 2012-104270 A | 5/2012 |
| JP | 2012-186135 A | 9/2012 |
| JP | 2012-243645 A | 12/2012 |
| JP | 2014-192041 A | 10/2014 |
| JP | 2016-207540 A | 12/2016 |
| JP | 2017-054720 A | 3/2017 |
| JP | 2018-206727 A | 12/2018 |
| WO | 2012/144298 A1 | 10/2012 |
| WO | 2013/175993 A1 | 11/2013 |
| WO | 2019197121 A1 | 10/2019 |
| WO | 2020/184476 A1 | 9/2020 |
| WO | 2021/079700 A1 | 4/2021 |

OTHER PUBLICATIONS

Dec. 8, 2020 Search Report issued in International Patent Application No. PCT/JP2020/036864.
Dec. 15, 2020 Search Report issued in International Patent Application No. PCT/JP2020/036904.
Nov. 28, 2023 English Translation of the Chinese Office Action issued in Chinese Patent Application No. 202080070736.X.
Apr. 12, 2024 English Translation of the Chinese Office Action issued in Chinese Patent Application No. 202080070736.X.
Sep. 29, 2024 Office Action issued in U.S. Appl. No. 17/765,566.
Jul. 22, 2025 Office Action issued in U.S. Appl. No. 17/765,566.

* cited by examiner

FIG. 1

ALL-SOLID-STATE BATTERY

TECHNICAL FIELD

The present invention relates to an all-solid-state battery. Priority is claimed on Japanese Patent Application No. 2019-192583, filed Oct. 23, 2019, the content of which is incorporated herein by reference.

BACKGROUND ART

In recent years, batteries have been used for various purposes. Batteries are also used, for example, in portable batteries, and are required to be smaller, lighter, thinner, and more reliable. Batteries using an electrolytic solution have problems such as liquid leakage and liquid depletion. Therefore, attention is focused on all-solid-state batteries using solid electrolytes.

An all-solid-state battery includes a positive electrode layer, a negative electrode layer, and a solid electrolyte layer. The positive electrode or the negative electrode expands and contracts when the all-solid-state battery is charged and discharged. The strain generated by the expansion and contraction of the positive electrode or the negative electrode is one of the causes of occurrence of cracks and one of the causes of peeling at the laminated interface of each layer.

For example, Patent Literature 1 discloses an all-solid-state battery having three solid electrolyte layers having different porosities between a positive electrode layer and a negative electrode layer. The three solid electrolyte layers having different porosities absorb the internal stress and suppress the occurrence of cracks.

CITATION LIST

Patent Literature

[Patent Literature 1]
PCT International Publication No. WO 2013/175993

SUMMARY OF INVENTION

Technical Problem

Cracks and interfacial peeling are one of the causes of increase in internal resistance and one of the causes of deterioration of cycle characteristics.

Patent Literature 1 discloses a method for suppressing cracks. However, the structure of the all-solid-state battery is complicated and manufacturing is difficult. In addition, the thickness in the lamination direction increases, and the thickness of the entire all-solid-state battery increases.

The present invention has been made in view of the above-described problems, and an object thereof is to provide an all-solid-state battery capable of suppressing the occurrence of cracks and peeling at a laminated interface.

Solution to Problem

The inventors have found that, by providing a void having a predetermined shape in the negative electrode layer or the positive electrode layer, which is the source origin of internal stress, the internal stress generated in the all-solid-state battery can be relaxed and the occurrence of cracks or interfacial peeling can be absorbed. That is, in order to solve the above-described problems, the following means are provided.

(1) According to a first aspect, there is provided an all-solid-state battery including: a positive electrode layer, a negative electrode layer, and a solid electrolyte layer positioned between the positive electrode layer and the negative electrode layer, in which the positive electrode layer includes a positive electrode current collector and a positive electrode active material layer which is in contact with the positive electrode current collector, the negative electrode layer includes a negative electrode current collector and a negative electrode active material layer which is in contact with the negative electrode current collector, at least one of the positive electrode active material layer and the negative electrode active material layer has a plurality of voids therein, and the plurality of voids include anisotropic voids in which an aspect ratio obtained by dividing a length in a major axis direction by a length in a minor axis direction is 2 or more and 29 or less.

(2) In the all-solid-state battery according to the above-described aspect, at least a part of a side margin layer, which is disposed on an outer periphery thereof along each of the positive electrode layer and the negative electrode layer, may have a plurality of voids therein, and the plurality of voids may include an anisotropic void in which the aspect ratio obtained by dividing the length in the major axis direction by the length in the minor axis direction is 2 or more and 29 or less.

(3) In the all-solid-state battery according to the above-described aspect, 30% or more of the plurality of voids may be the anisotropic voids.

(4) In the all-solid-state battery according to the above-described aspect, the major axis direction of the anisotropic void may substantially coincide with an in-plane direction in which the positive electrode active material layer or the negative electrode active material layer spreads.

(5) In the all-solid-state battery according to the above-described aspect, an average length of the anisotropic void in the major axis direction may be 0.2 μm or more and 40 μm or less, and the average length of the anisotropic void in the minor axis direction may be 0.1 μm or more and 5 μm or less.

(6) In the all-solid-state battery according to the above-described aspect, a ratio of the plurality of voids in the positive electrode active material layer or the negative electrode active material layer may be 3% or more and 30% or less.

(7) In the all-solid-state battery according to the above-described aspect, an intermediate layer having ionic conductivity may be provided between at least one of the positive and negative electrode layers and the solid electrolyte layer, the intermediate layer may have a plurality of voids, and a ratio of the plurality of voids in the intermediate layer may be 0.1% or more and 8% or less.

Advantageous Effects of Invention

The all-solid-state battery according to the above-described aspect can suppress the occurrence of cracks and peeling at the laminated interface.

BRIEF DESCRIPTION OF DRAWINGS

FIG. 1 is a schematic sectional view of an all-solid-state battery according to the present embodiment.

DESCRIPTION OF EMBODIMENTS

Figure 2:
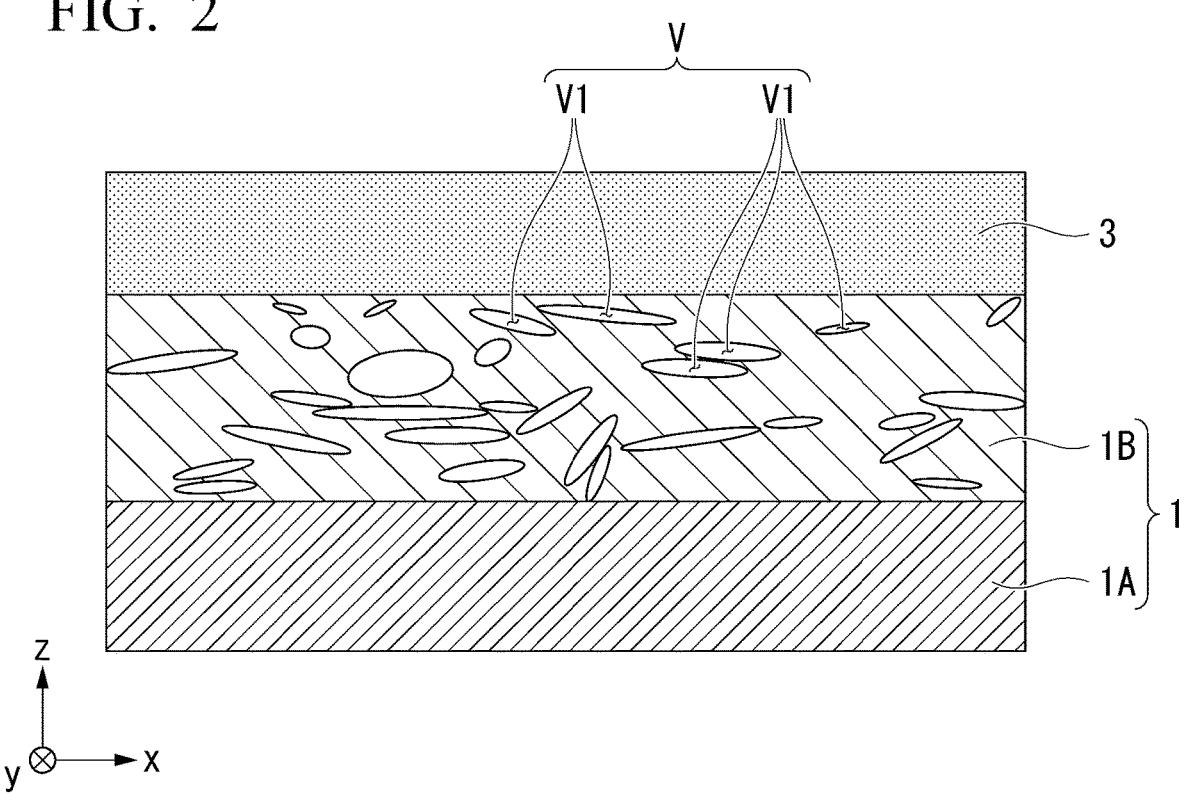
FIG. 2 is an enlarged view of a main part of the all-solid-state battery according to the present embodiment.

Hereinafter, the present invention will be described in detail with reference to the drawings as appropriate. In the drawings used in the following description, characteristic parts may be enlarged and illustrated in order to make it easy to understand the features of the present invention, and the dimensional ratios of each configuration element may differ from the actual ones. In addition, the materials and dimensions exemplified in the following description are examples, and the present invention is not necessarily limited thereto, but can be appropriately changed and carried out without changing the gist thereof.

First, the directions will be defined. The direction in which a positive electrode layer 1 and a negative electrode layer 2 (which will be described later) are laminated is defined as a z direction. Further, one of the in-plane directions in which the positive electrode layer 1 and the negative electrode layer 2 (which will be described later) spread is defined as an x direction, and the direction orthogonal to the x direction is defined as a y direction.

[All-Solid-State Battery]

Figure 1:
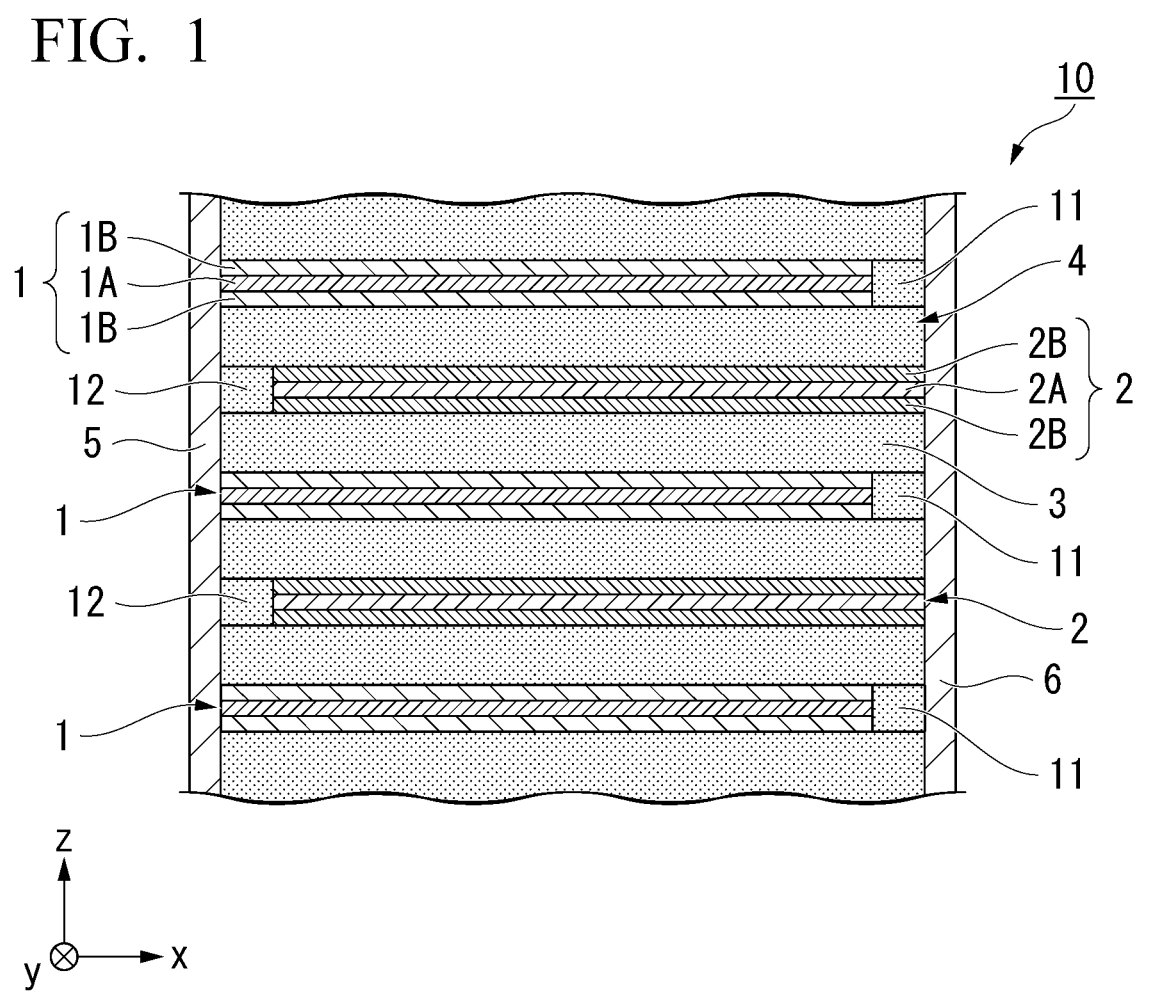

FIG. 1 is a schematic sectional view in which a main part of an all-solid-state battery according to a first embodiment is enlarged. As illustrated in FIG. 1, an all-solid-state battery 10 has a laminate 4. The laminate 4 has a plurality of positive electrode layers 1, a plurality of negative electrode layers 2, and a solid electrolyte layer 3 positioned between the positive electrode layers 1 and the negative electrode layers 2. The positive electrode layers 1 are an example of a first electrode layer, and the negative electrode layers 2 are an example of a second electrode layer. Any one of the first electrode layer and the second electrode layer functions as a positive electrode, and the other functions as a negative electrode. The positive electrode layers 1 and the negative electrode layers 2 are each connected to external terminals having corresponding polarity, and the positive electrode layers 1 and the negative electrode layers 2 are not in contact with each other.

The positive electrode layers 1 are each connected to a first external terminal 5, and the negative electrode layers 2 are each connected to a second external terminal 6. The first external terminal 5 and the second external terminal 6 are electrical contacts with the outside.

(Laminated Body)

The laminate 4 has the plurality of positive electrode layers 1, the plurality of negative electrode layers 2, and a plurality of solid electrolyte layers 3. The solid electrolyte layers 3 are positioned between each of the positive electrode layers 1 and the negative electrode layers 2. The all-solid-state battery 10 is charged and discharged by exchanging lithium ions between the positive electrode layers 1 and the negative electrode layers 2 via the solid electrolyte layers 3.

[Positive Electrode Layers and Negative Electrode Layers]

For example, the plurality of positive electrode layers 1 and the plurality of negative electrode layers 2 are provided in the laminate 4. The positive electrode layers 1 and the negative electrode layers 2 are alternately laminated in the z direction with the solid electrolyte layers 3 interposed therebetween. Each of the positive electrode layers 1 and the negative electrode layers 2 spreads in the xy plane. A first end portion of the positive electrode layers 1 is connected to the first external terminal 5, and a second end portion extends toward the second external terminal 6. The second end portion of the positive electrode layers 1 is not connected to the second external terminal 6. The first end portion of the negative electrode layers 2 is connected to the second external terminal 6, and the second end portion extends toward the first external terminal 5. The second end portion of the negative electrode layers 2 is not connected to the first external terminal 5. A material similar to that of the solid electrolyte layers 3 is between the positive electrode layers 1 and the second external terminal 6 and between the negative electrode layers 2 and the first external terminal 5.

The positive electrode layers 1 have a positive electrode current collector layer 1A and a positive electrode active material layer 1B. The negative electrode layers 2 have a negative electrode current collector layer 2A and a negative electrode active material layer 2B.

The positive electrode current collector layer 1A and the negative electrode current collector layer 2A spread in the xy plane. The positive electrode current collector layer 1A and the negative electrode current collector layer 2A contain a material having excellent conductivity. The positive electrode current collector layer 1A and the negative electrode current collector layer 2A are parts containing a material having excellent conductivity at 50% or more when the all-solid-state battery 10 is divided along the xy plane. Materials having excellent conductivity are, for example, silver, palladium, gold, platinum, aluminum, copper, and nickel. Copper does not easily react with positive electrode active materials, negative electrode active materials, or solid electrolytes. For example, when copper is used for the positive electrode current collector layer 1A and the negative electrode current collector layer 2A, the internal resistance of the all-solid-state battery 10 can be reduced. The substances that form the positive electrode current collector layer 1A and the negative electrode current collector layer 2A may be the same or different.

The positive electrode current collector layer 1A may contain a positive electrode active material which will be described later. The negative electrode current collector layer 2A may contain a negative electrode active material which will be described later. The content ratio of the active material contained in each current collector layer is not particularly limited as long as the layer functions as a current collector. The volume ratio of the conductive material and the positive electrode active material in the positive electrode current collector layer 1A is, for example, in the range of 90:10 to 70:30. Similarly, the volume ratio of the conductive material and the negative electrode active material in the negative electrode current collector layer 2A is, for example, in the range of 90:10 to 70:30. When the positive electrode current collector layer 1A and the negative electrode current collector layer 2A contain the positive electrode active material and the negative electrode active material, respectively, the adhesion between the positive electrode current collector layer 1A and the positive electrode active material layer 1B and the adhesion between the negative electrode current collector layer 2A and the negative electrode active material layer 2B are improved.

The positive electrode active material layer 1B and the negative electrode active material layer 2B spread in the xy plane. The positive electrode active material layer 1B is formed on one surface or both surfaces of the positive electrode current collector layer 1A. The positive electrode active material layer 1B may not be present on the surface of the positive electrode current collector layer 1A on the side where the opposing negative electrode layer 2 is not located. Further, the negative electrode active material layer 2B is formed on one surface or both surfaces of the negative electrode current collector layer 2A. The negative electrode active material layer 2B may not be present on the surface of the negative electrode current collector layer 2A on the side where the opposing positive electrode layer 1 is not located. For example, the positive electrode layer 1 or the negative electrode layer 2 positioned at the uppermost layer or the lowermost layer of the laminate 4 may not have the positive electrode active material layer 1B or the negative electrode active material layer 2B on one surface.

The positive electrode active material layer 1B and the negative electrode active material layer 2B contain active materials that exchange electrons during charging and discharging. The positive electrode active material layer 1B contains a positive electrode active material. The negative electrode active material layer 2B contains a negative electrode active material. The positive electrode active material layer 1B and the negative electrode active material layer 2B may each contain a conductive auxiliary agent, a binding agent, or the like. It is preferable for the positive electrode active material and the negative electrode active material to be able to efficiently insert and desorb lithium ions.

The positive electrode active material and the negative electrode active material are, for example, a transition metal oxide and a transition metal composite oxide. Specifically, the positive electrode active material and the negative electrode active material are, for example, a lithium manganese composite oxide $Li_2Mn_aMa_{1-a}O_3$ ($0.8 \leq a \leq 1$, $Ma=Co$, $Ni$), lithium cobalt oxide ($LiCoO_2$), lithium nickel oxide ($LiNiO_2$), lithium manganese spinel ($LiMn_2O_4$), a composite metal oxide represented by a general formula $LiNi_xCo_yMn_zO_2$ ($x+y+z=1$, $0 \leq x \leq 1$, $0 \leq y \leq 1$, $0 \leq z \leq 1$), a lithium vanadium compound ($LiV_2O_5$), olivine-type $LiMbPO_4$ (where Mb is one or more elements selected from Co, Ni, Mn, Fe, Mg, Nb, Ti, Al, and Zr), lithium vanadium phosphate ($Li_3V_2(PO_4)_3$, $Li_2VTi(PO_4)_3$, $LiVOPO_4$), a Li excess solid solution positive electrode represented by $Li_2MnO_3$—$LiMcO_2$ (Mc=Mn, Co, Ni), lithium titanate ($Li_4Ti_5O_{12}$), a composite metal oxide represented by $Li_sNi_tCo_uAl_vO_2$ ($0.9<s<1.3$, $0.9<t+u+v<1.1$) or the like.

There is no clear distinction between the active materials that form the positive electrode active material layer 1B and the negative electrode active material layer 2B, and by comparing the potentials of the two types of compounds, the compound showing a more noble potential can be used as the positive electrode active material and a compound showing a lower potential can be used as the negative electrode active material.

At least one of the positive electrode active material layer 1B and the negative electrode active material layer 2B has a plurality of voids therein. FIG. 2 is an enlarged schematic view of the vicinity of the interface between the positive electrode layer 1 and the solid electrolyte layer 3 of the all-solid-state battery 10 according to the present embodiment. The positive electrode active material layer 1B illustrated in FIG. 2 has a plurality of voids V. Although the positive electrode active material layer 1B is illustrated in FIG. 2, the negative electrode active material layer 2B may have a plurality of voids V, and the positive electrode active material layer 1B and the negative electrode active material layer 2B may have a plurality of voids V.

The plurality of voids V are formed between the active materials that form the positive electrode active material layer 1B or the negative electrode active material layer 2B. Since the active material is responsible for the conduction of electrons during charging and discharging, it is common to densely fill the positive electrode active material layer 1B and the negative electrode active material layer 2B with the active material. The plurality of voids V are intentionally provided.

The ratio of the plurality of voids V in the positive electrode active material layer 1B or the negative electrode active material layer 2B (hereinafter, referred to as an area ratio of the plurality of voids V) is, for example, 3% or more and 30% or less. The area ratio of the plurality of voids V is obtained as, for example, an average value of the area ratio of the black region when each of the plurality of cross-sectional images obtained by a scanning electron microscope (SEM) is binarized. Hereinafter, a specific method for obtaining the area ratio of the plurality of voids V will be described by taking a case where the plurality of voids V exist in the positive electrode active material layer 1B as an example.

First, five xz cross sections and five yz cross sections of the positive electrode active material layer 1B are imaged. Each of the areas of the positive electrode active material layer 1B is obtained in each image. In the actual SEM image, the interface between the positive electrode current collector layer 1A and the positive electrode active material layer 1B and the interface between the positive electrode active material layer 1B and the solid electrolyte layer 3 are not flat. Therefore, the area of the positive electrode active material layer 1B is converted as the area of the region interposed between the xy plane that spreads to the average height position of the interface between the positive electrode current collector layer 1A and the positive electrode active material layer 1B, and the xy plane that spreads to the average height position of the interface between the positive electrode active material layer 1B and the solid electrolyte layer 3.

Next, the areas of the plurality of voids V in each image are obtained. The areas of the plurality of voids V can be obtained, for example, by the following procedure. First, the luminance of the part of the conductive material of the positive electrode current collector layer 1A and the luminance of the part of the plurality of voids V are extracted from each of the taken images. The part of the conductive material of the positive electrode current collector layer 1A is white, and is regarded as the upper limit of luminance in each image. The plurality of voids V are black and are regarded as the lower limit of luminance in each image. The area between the upper limit of the luminance and the lower limit of the luminance is the luminance range in each image. Next, each image is binarized (hereinafter, the image after binarization is referred to as a binarized image) with the luminance on the upper limit of the luminance by 5% of the luminance range from the lower limit of the luminance as a threshold value in each image. In the binarized image, a part having a luminance lower than the threshold value is a black region, and a part having a luminance higher than the threshold value is a white region. The area of the black region in the binarized image is the area of the plurality of voids V. Then, the area ratio of the positive electrode active material layer 1B of the plurality of voids V in each image is obtained, and the area ratio of the plurality of voids V is obtained by calculating the average value. It is difficult to properly confirm an anisotropic void V1 having a major axis size of 50 nm or less by SEM (magnification range of 500 to 5000 times), and the anisotropic void V1 having a major axis size of 50 nm or less is excluded when measuring the area ratio, the ratio of the anisotropic void V1 (which will be described later) to the plurality of voids, and the size of the anisotropic void V1.

At least one of the plurality of voids V is the anisotropic void V1. The anisotropic void V1 is preferably 30% or more, more preferably 50% or more, and still more preferably 80% or more of the plurality of voids V. The anisotropic void V1 is a void in which the aspect ratio obtained by dividing the length in the major axis direction by the length in the minor axis direction is 2 or more and 29 or less.

In FIG. 2, the anisotropic void V1 is schematically illustrated as an ellipse. However, the shape of the anisotropic void V1 does not matter. The anisotropic void V1 is, for example, amorphous. When the void is amorphous, the assumed ellipse having the smallest area including one black region in the binarized image is assumed as the shape of the void, and the length in the major axis direction and the length in the minor axis direction of the assumed ellipse are considered as the length in the major axis direction and the length in the minor axis direction of the void. Here, the shape of the void and the ellipse to be assumed are determined as follows. Among ellipses with the smallest area including the ellipse, when a length LLe in the major axis direction of the ellipse is superimposed on a length LLc in the direction in which the length of the void V is the longest (LLe=LLC), the ellipse with the shortest length SLe in the minor axis direction is assumed as the shape of this void.

The average length of the anisotropic void V1 in the major axis direction is, for example, 0.2 μm or more and 100 μm or less, and preferably larger than 0.2 μm and 40 μm or less. The average length of the anisotropic void V1 in the minor axis direction is, for example, 0.1 μm or more and 50 μm or less, preferably larger than 0.1 μm and 20 μm or less, and more preferably larger than 0.1 μm and 5 μm or less. The average lengths of the anisotropic voids V1 in the major axis direction and the minor axis direction when there are a plurality of anisotropic voids V1 are obtained by extracting two anisotropic voids V1 from each of the above-described 10 binarized images as the average value of a total of 20 anisotropic voids V1.

Further, the anisotropic void V1 is preferably oriented in the xy plane. "Oriented in the xy plane" means that the major axis direction of the anisotropic void V1 is tilted by 45 degrees or more from the z direction. Further, it is preferable that the major axis direction of the anisotropic void V1 substantially coincide with the in-plane direction in which the xy plane spreads. The fact that the major axis direction of the anisotropic void V1 substantially coincides with the in-plane direction means that the tilt angle of the anisotropic void V1 with respect to the xy plane in the major axis direction is 10 degrees or less.

"Solid Electrolyte Layer"

The solid electrolyte layer 3 is positioned between the positive electrode layer 1 and the negative electrode layer 2, respectively. As will be described later, side margin layers 11 and 12 made of the same material as that of the solid electrolyte layer 3 may be provided between the positive electrode layer 1 and the second external terminal 6 and between the negative electrode layer 2 and the first external terminal 5.

The solid electrolyte layer 3 contains a solid electrolyte. The solid electrolyte is a substance (for example, particles) capable of moving ions by an electric field applied from the outside. For example, lithium ions move in a solid electrolyte by the electric field applied from the outside. The solid electrolyte is an insulator that inhibits the movement of electrons.

The solid electrolyte contains, for example, lithium. The solid electrolyte may be, for example, either an oxide-based material or a sulfide-based material. The solid electrolyte may be, for example, any of a perovskite type compound, a LISICON type compound, a garnet type compound, a NASICON type compound, a thio-LISICON type compound, a glass compound, and a phosphate compound. $La_{0.5}Li_{0.5}TiO_3$ is an example of a perovskite type compound. $Li_{14}Zn(GeO_4)_4$ is an example of a LISICON type compound. $Li_7La_3Zr_2O_{12}$ is an example of a garnet type compound. $LiZr_2(PO_4)_3$, $Li_{0.3}Al_{0.3}Ti_{1.7}(PO_4)_3$, $Li_{0.5}Al_{0.5}Ge_{1.5}(PO_4)_3$, $Li_{1.55}Al_{0.2}Zr_{1.7}Si_{0.25}P_{9.75}O_{12}$, $Li_{1.4}Na_{0.1}Zr_{1.5}Al_{0.5}(PO_4)_3$, $Li_{1.4}Ca_{0.25}Er_{0.3}Zr_{1.7}(PO_4)_{3.2}$, and $Li_{1.4}Ca_{0.25}Yb_{0.3}Zr_{1.7}(PO_4)_{3.2}$ are examples of a NASICON type compound. $Li_{3.25}Ge_{0.25}P_{0.75}S_4$ and $Li_3PS_4$ are examples of a thio-LISICON type compound. $Li_2S—P_2S_5$ and $Li_2O—V_2O_5—SiO_2$ are examples of a glass compound. $Li_3PO_4$, $Li_{3.5}Si_{0.5}P_{0.5}O_4$, and $Li_{2.9}PO_{3.3}N_{0.46}$ are examples of a phosphate compound. The solid electrolyte may contain one or more of these compounds.

The shape of the solid electrolyte is not particularly limited. The shape of the solid electrolyte is, for example, spherical, ellipsoidal, needle-like, plate-like, scale-like, tubular, wire-like, rod-like, or amorphous. The particle size of the solid electrolyte is, for example, 0.1 μm or more and 10 μm or less, and may be 0.3 μm or more and 9 μm or less. The particle size of the particles is obtained from the measured value (D50) obtained by measuring the particle size distribution. D50 is the diameter of the particles in which the integrated value in the distribution curve obtained by measuring the particle size distribution is 50%. The particle size distribution of the particles is measured by, for example, a particle size distribution measuring device using a laser diffraction/scattering method (microtrack method).

[Side Margin Layer]

As illustrated in FIG. 1, the laminate 4 is disposed on the outer periphery thereof along each of the positive electrode layer 1 and the negative electrode layer 2, and includes side margin layers 11 and 12 containing a solid electrolyte. The side margin layers 11 and 12 may be referred to as a positive electrode side margin layer and a negative electrode side margin layer, respectively.

The solid electrolyte contained in the side margin layers 11 and 12 may be the same as or different from the solid electrolyte contained in the solid electrolyte layer 3.

The side margin layers 11 and 12 are preferably provided in order to eliminate the step between the solid electrolyte layer 3 and the positive electrode layer 1 and the step between the solid electrolyte layer 3 and the negative electrode layer 2. Therefore, the side margin layers 11 and 12 are formed at substantially the same height as that of the positive electrode layer 1 or the negative electrode layer 2 (that is, so as to be disposed along each of the positive electrode layer 1 and the negative electrode layer 2) in regions other than the positive electrode layer 1 and the negative electrode layer 2 on the main surface of the solid electrolyte layer 3. Due to the presence of the side margin layers 11 and 12, the steps between the solid electrolyte layer 3 and the positive electrode layer 1 and the solid electrolyte layer 3 and the negative electrode layer 2 are eliminated, and thus the interfaces between the solid electrolyte layer 3 and each electrode layer become dense, and delamination and warpage due to firing of the all-solid-state battery are less likely to occur.

At least a part of the side margin layers 11 and 12 can have a plurality of voids therein. When the side margin layers 11 and 12 do not have a plurality of voids therein, the side margin layers 11 and 12 can have the same configuration as that of the solid electrolyte layer 3. It is preferable that each of the side margin layers 11 and 12 have a plurality of voids therein. The configuration of the plurality of voids contained inside the side margin layers 11 and 12 can be the same as that of the plurality of voids V contained in at least one of the positive electrode active material layer 1B and the negative electrode active material layer 2B.

At least one of the plurality of voids is the anisotropic void. The anisotropic void is preferably 30% or more, more preferably 50% or more, and still more preferably 80% or more of the plurality of voids included in the side margin layer. The anisotropic void is a void in which the aspect ratio obtained by dividing the length in the major axis direction by the length in the minor axis direction is 2 or more and 29 or less.

The ratio of the plurality of voids in the side margin layers 11 and 12 (hereinafter, referred to as the area ratio of the plurality of voids in the side margin layer) is, for example, 3% or more and 30% or less. The area ratio of the plurality of voids in the side margin layer is obtained by the same method as that of the area ratio of the plurality of voids in the positive electrode active material 1B and the negative electrode active material 2B, for example, as an average value of the area ratio of the black region when each of the plurality of cross-sectional images obtained by a scanning electron microscope (SEM) is binarized.

(Terminal)

For the first external terminal 5 and the second external terminal 6, for example, a material having excellent conductivity is used. The first external terminal 5 and the second external terminal 6 are, for example, any of silver, gold, platinum, aluminum, copper, tin, or nickel. The first external terminal 5 and the second external terminal 6 may be a single layer or a plurality of layers.

(Protective Layer)

The all-solid-state battery 10 may have a protective layer on the outer periphery that electrically, physically, and chemically protects the laminate 4 or the terminal. As the protective layer, for example, an environmentally safe material having excellent insulation, durability, and moisture resistance is preferable. The protective layer is, for example, glass, ceramics, a thermosetting resin, or a photocurable resin. Only one type of protective layer material may be used, or a plurality of protective layer materials may be used in combination. The protective layer may be a single layer or a plurality of layers. The protective layer is preferably an organic-inorganic hybrid in which a thermosetting resin and ceramic powder are mixed.

Next, a method for manufacturing an all-solid-state battery according to the present embodiment will be described.

The all-solid-state battery 10 may be prepared by a simultaneous firing method or a sequential firing method. The simultaneous firing method is a method of laminating the materials that form each layer and then firing the materials all at once. The sequential firing method is a method of firing each layer each time the layers are laminated. The simultaneous firing method has a simpler work process than that of the sequential firing method. Further, the laminate 4 prepared by the simultaneous firing method is denser than the laminate 4 prepared by the sequential firing method. Hereinafter, a case where the simultaneous firing method is used will be described as an example.

First, a paste for each layer that forms the laminate 4 is prepared. The materials that form the positive electrode current collector layer 1A, the positive electrode active material layer 1B, the solid electrolyte layer 3, the side margin layers 11 and 12, the negative electrode active material layer 2B, and the negative electrode current collector layer 2A are each made into a paste. The pasting method is not particularly limited. For example, the powder of each material is mixed with a vehicle to obtain a paste. Vehicle is a general term for media in the liquid phase. The vehicle contains a solvent and a binder.

A filler is added to at least one of the vehicles of the positive electrode active material layer 1B and the negative electrode active material layer 2B. When voids are to be included inside the side margin layers 11 and 12, the filler is also added to the vehicles of the side margin layers 11 and 12. The filler is, for example, a debinder, a resin material, or a carbon material. All fillers volatilize during firing. The carbon material used as a filler volatilizes during firing and is distinguishable from conductive auxiliary agents. The filler is, for example, scale-like graphite, amorphous carbon, or a pore forming material. The pore forming material is, for example, resin particles such as polyethylene, polypropylene, and polyethylene terephthalate. The filler has anisotropy in shape. The aspect ratio obtained by dividing the length of the filler in the major axis direction by the length in the minor axis direction is, for example, 2 or more and 29 or less. The filler volatilizes during firing to form the anisotropic void V1. Regarding the size of the filler to be added, the active material shrinks due to firing, and the size of the voids also shrinks. The size of the filler is calculated back from the shrinkage rate of the active material and is larger than the size of the target void. For example, when the shrinkage rate by firing is 0.8, the size of the filler can be calculated as 4 μm÷ 0.8=5 μm to form a void having a diameter of 4 μm, and a filler having a diameter of 5 μm is added.

Next, a green sheet is prepared. The green sheet is a paste processed into a sheet. The green sheet is obtained, for example, by coating a base material such as polyethylene terephthalate (PET) with the paste in a desired order, drying the paste as necessary, and then peeling the paste from the base material. The paste coating method is not particularly limited. For example, known methods such as screen printing, coating, transfer, and doctor blade can be adopted.

When preparing the green sheet of the positive electrode active material layer 1B and the negative electrode active material layer 2B, the filler can be oriented in the xy in-plane direction by controlling the coating speed or performing coating through a mesh having an opening. When the filler is oriented in the xy in-plane direction, the anisotropic void V1 is oriented in the xy in-plane direction in the positive electrode active material layer 1B and the negative electrode active material layer 2B after preparation.

Each of the prepared green sheets is stacked in a desired order with the desired number of laminated layers. Alignment, cutting, and the like are performed as necessary to prepare a laminate. When a parallel type or series/parallel type battery is prepared, the positive electrode current collector layer and the negative electrode current collector layer are aligned such that the end surface of the positive electrode current collector layer the end surface of the negative electrode current collector layer do not coincide with each other.

The laminate may be prepared after preparing the positive electrode active material layer unit and the negative electrode active material layer unit described below.

First, a paste for a solid electrolyte layer is formed on a PET film in the form of a sheet by the doctor blade method, and dried. Next, the paste for the positive electrode active material layer is printed on the green sheet of the solid electrolyte layer by screen printing, and dried. Then, the paste for the side margin layer is screen-printed in the region of the solid electrolyte layer sheet other than the positive electrode layer and dried to form a side margin layer having a height substantially equal to that of the positive electrode layer.

Next, the paste for the positive electrode current collector layer is printed on the dried paste for the positive electrode active material layer by screen printing, and dried. Furthermore, the paste for the positive electrode active material layer is printed again on the dried paste for the positive electrode current collector layer by screen printing, and dried. Then, a positive electrode unit is prepared by peeling off the PET film. In the positive electrode unit, the positive electrode layer 1, in which the positive electrode active material layer 1B, the positive electrode current collector layer 1A, and the positive electrode active material layer 1B are laminated in this order, and the side margin layer 11 are formed on the main surface of the solid electrolyte layer 3.

A negative electrode unit is also prepared by the same procedure. In the negative electrode unit, the negative electrode layer 2, in which the negative electrode active material layer 2B, the negative electrode current collector layer 2A, and the negative electrode active material layer 2B are laminated in this order and the side margin layer 12, are formed on the main surface of the solid electrolyte layer 3.

Next, the positive electrode unit and the negative electrode unit are laminated. The positive electrode unit and the negative electrode unit are laminated such that the solid electrolyte layers of each of the units do not face each other. In the laminate formed by lamination, the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layers 3 are laminated in this order. The positive electrode unit and the negative electrode unit are stacked in a staggered manner such that the positive electrode current collector layer 1A is exposed to a first end surface of the laminate, and the negative electrode current collector layer 2A is exposed to a second end surface opposite to the first end surface. A sheet for the solid electrolyte layer having a predetermined thickness is further stacked, for example, on the uppermost layer and the lowermost layer in the lamination direction, and dried.

Next, the prepared laminates are collectively crimped. Crimping is performed while heating. The heating temperature is, for example, 40 to 95° C. Next, the crimped laminate is sintered. Sintering is performed, for example, by heating in a temperature range of 500° C. or higher and 1000° C. or lower in a nitrogen atmosphere. The firing time is, for example, 0.1 to 3 hours. The laminate 4 is obtained by sintering. At this time, the filler becomes the anisotropic void V1.

The sintered body may be placed in a cylindrical container together with a polishing material such as alumina, and barrel-polished. The corners of the sintered body are chamfered by polishing. Polishing may be performed by sandblasting or the like.

Finally, the first external terminal 5 and the second external terminal 6 are attached to the laminate 4. The first external terminal 5 and the second external terminal 6 are formed so as to be in electrical contact with the positive electrode current collector layer 1A or the negative electrode current collector layer 2A, respectively. For example, the first external terminal 5 is connected to the positive electrode current collector layer 1A exposed from the side surface of the laminate 4, and the second external terminal 6 is connected to the negative electrode current collector layer 2A exposed from the side surface of the laminate 4. The first external terminal 5 and the second external terminal 6 can be prepared by, for example, a sputtering method, a dipping method, a spray coating method, or the like.

In the all-solid-state battery according to the present embodiment, at least one of the positive electrode active material layer 1B and the negative electrode active material layer 2B has the anisotropic void V1 therein such that the occurrence of cracks and peeling at the laminated interface can be suppressed. The active material contained in the positive electrode active material layer 1B and the negative electrode active material layer 2B expands and contracts during charging and discharging. The volume change of the active material causes internal stress and can cause cracks and interfacial peeling. However, the anisotropic void V1 functions as a buffering portion, and accordingly, the occurrence of cracks and interfacial peeling can be suppressed.

When the aspect ratio of the anisotropic void V1 is less than 2, the shape of the void is substantially isotropic. Pressure is evenly applied to the substantially isotropic voids, and the voids cannot sufficiently function as a buffering portion for volume changes of the active material. On the other hand, the anisotropic void V1 is easily crushed in the minor axis direction due to the anisotropy of the shape, and can properly buffer the volume change of the active material. When the aspect ratio of the anisotropic void V1 is larger than 29, strain is concentrated on the active material adjacent to the void, and cracks are likely to occur in the active material adjacent to the void.

Further, the positive electrode active material layer 1B and the negative electrode active material layer 2B expand and contract mainly in the z direction. When the anisotropic void V1 is oriented in the xy plane, the minor axis direction of the anisotropic void V1 becomes the z direction. The anisotropic void V1 is easily crushed in the minor axis direction, the minor axis direction of the anisotropic void V1 is the z direction, and accordingly, cracks and interfacial peeling can be suppressed more effectively.

Further, the extremely large anisotropic void V1 can cause cracks and the like. The length of the anisotropic void V1 in the major axis direction is 0.2 μm or more and 40 μm or less, the length of the anisotropic void V1 in the minor axis direction is 0.1 μm or more and 5 μm or less, and accordingly, the occurrence of cracks and interfacial peeling can be suppressed more effectively.

Further, when the area ratio of the plurality of voids V is 3% or more and 30% or less, cracks and interfacial peeling can be suppressed while suppressing a decrease in the capacity of the all-solid-state battery.

Although the embodiments of the present invention have been described above in detail with reference to the drawings, the respective configurations and combinations thereof in the respective embodiments are merely examples, and additions, omissions, substitutions, and other changes of configurations are possible within the scope not departing from the gist of the present invention.

First Modification Example

Figure 3:
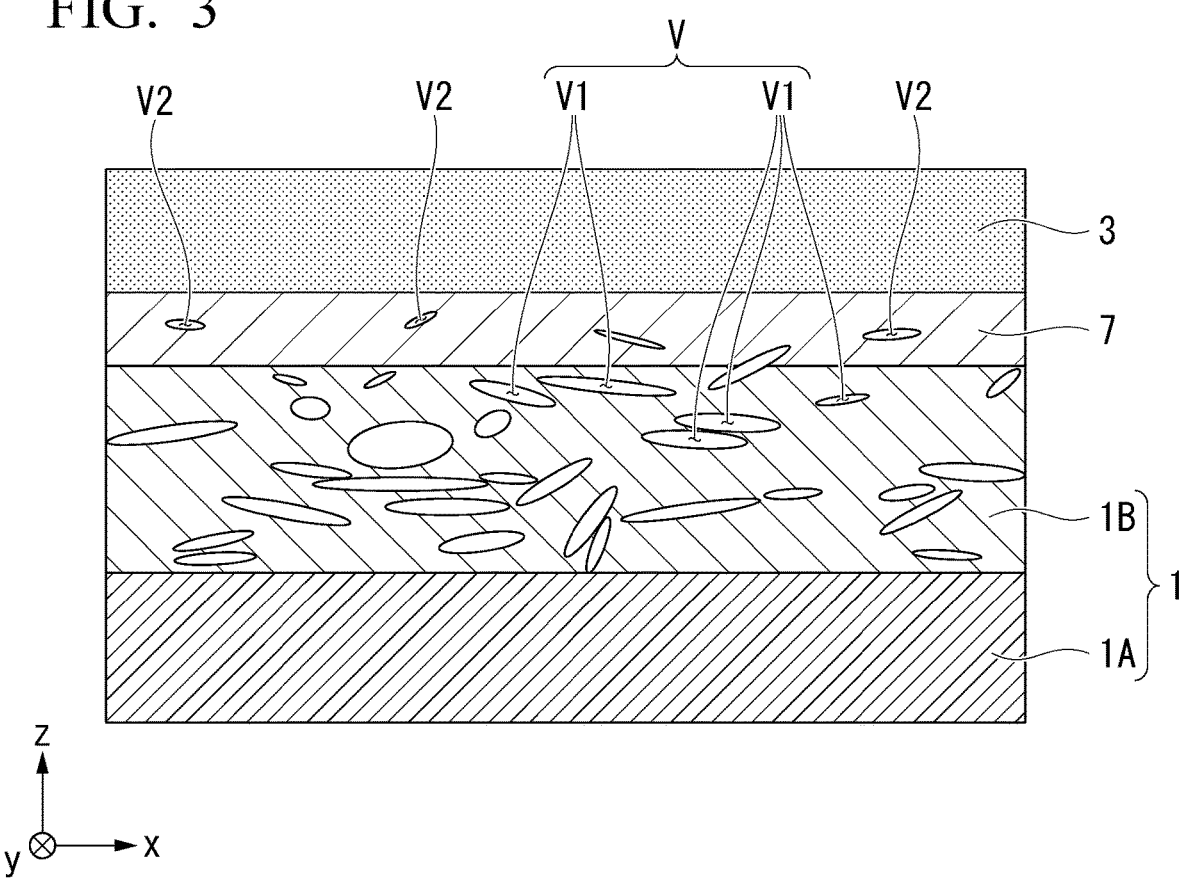
FIG. 3 is an enlarged view of a main part of an all-solid-state battery according to a first modification example.

FIG. 3 is an enlarged sectional view of a main part of an all-solid-state battery according to a first modification example. FIG. 3 is an enlarged view of the vicinity of the interface between the positive electrode layer 1 and the solid electrolyte layer 3 of the all-solid-state battery. The all-solid-state battery illustrated in FIG. 3 differs from the all-solid-state battery illustrated in FIG. 2 in that the intermediate layer 7 is provided between the positive electrode layer 1 and the solid electrolyte layer 3. Although FIG. 3 illustrates an example in which the intermediate layer 7 is provided between the positive electrode layer 1 and the solid electrolyte layer 3, the intermediate layer 7 may be provided between the negative electrode layer 2 and the solid electrolyte layer 3.

The intermediate layer 7 spreads in the xy plane and is positioned between the positive electrode active material layer 1B or the negative electrode active material layer 2B and the solid electrolyte layer 3. The intermediate layer 7 is a layer having a composition between the active material that forms the positive electrode active material layer 1B or the negative electrode active material layer 2B and the solid electrolyte that forms the solid electrolyte layer 3. For example, when the positive electrode active material layer 1B or the negative electrode active material layer 2B is lithium vanadium phosphate ($Li_3V_2(PO_4)_3$, $LiVOPO_4$) and the solid electrolyte is lithium zirconium phosphate ($LiZr_2(PO_4)_3$), the intermediate layer 7 is lithium zirconium phosphate containing vanadium or lithium vanadium phosphate containing zirconium. Lithium zirconium phosphate containing vanadium is obtained by replacing a part of zirconium of lithium zirconium phosphate with vanadium. Lithium vanadium phosphate containing zirconium is obtained by replacing a part of vanadium of vanadium lithium phosphate with zirconium. The intermediate layer 7 enhances the bonding strength between the positive electrode active material layer 1B or the negative electrode active material layer 2B and the solid electrolyte layer 3.

The intermediate layer 7 may have, for example, a plurality of voids $V_2$. The ratio of the plurality of voids V2 in the intermediate layer 7 is preferably 0.1% or more and 8% or less. When the intermediate layer 7 also has the plurality of voids V2, the internal stress associated with the expansion and contraction of the active material can be absorbed, and the occurrence of cracks and interfacial peeling can be suppressed more effectively. Further, since the ratio of the plurality of voids V2 in the intermediate layer 7 is not extremely high, the bonding strength between the positive electrode active material layer 1B or the negative electrode active material layer 2B and the solid electrolyte layer 3 can be maintained, and the occurrence of interfacial peeling can be suppressed more effectively.

The intermediate layer 7 is obtained by separately preparing a layer in which constituent elements were adjusted in advance and inserting the prepared layer between the solid electrolyte layer 3 and the positive electrode active material layer 1B or the negative electrode active material layer 2B. Further, the firing conditions may be adjusted to thermally diffuse the constituent elements (for example, zirconium) of the solid electrolyte layer 3 into the positive electrode active material layer 1B or the negative electrode active material layer 2B, or to thermally diffuse the constituent elements (for example, vanadium) of the positive electrode active material layer 1B or the negative electrode active material layer 2B into the solid electrolyte layer 3.

The all-solid-state battery according to the first modification example has the same effect as that of the all-solid-state battery according to the first embodiment. Further, the intermediate layer 7 can enhance the bonding strength between the positive electrode active material layer 1B or the negative electrode active material layer 2B and the solid electrolyte layer 3, and can more effectively suppress the occurrence of interfacial peeling.

EXAMPLES

Example 1

The all-solid-state battery of Example 1 was prepared as follows.

(Preparation of Active Material)

As the active material, lithium vanadium phosphate prepared by the following method was used. Using $Li_2CO_3$, $V_2O_5$, and $NH_4H_2PO_4$ as starting materials, wet mixing was performed in a ball mill for 16 hours, and the powder obtained after dehydration drying was calcined at 850° C. for 2 hours in a nitrogen-hydrogen mixed gas. The calcined product was wet-pulverized in a ball mill and then dehydrated and dried to obtain an active material. It was confirmed by using an X-ray diffractometer that the prepared powder had the same crystal structure as that of $Li_3V_2(PO_4)_3$.

(Preparation of Paste for Active Material Layer)

Regarding the paste for the active material layer, the paste for the positive electrode active material layer and the paste for the negative electrode active material layer were prepared by adding 15 parts of ethyl cellulose as a binder and 65 parts of dihydroterpineol as a solvent to 95 parts of active material powder, 2 parts of filler (polyethylene), and 3 parts of flat carbon material (artificial graphite: TIMREX (registered trademark) Graphite KS-6L) powder, which were obtained together and by performing mixing and dispersing. As the filler, a filler having a length in the major axis direction of 0.63 μm, a length in the minor axis direction of 0.13 μm, and an aspect ratio of 5.0 was used.

(Preparation of Solid Electrolyte)

As the solid electrolyte, an LZP-based NASICON type compound (for example, $LiZr_{1.7}Ca_{0.3}(PO_4)_3$) prepared by the following method was used. Using $Li_2CO_3$, $ZrO_2$, $CaCO_3$, and $NH_4H_2PO_4$ as starting materials, wet mixing was performed in a ball mill for 16 hours, dehydrated, and dried, and then the obtained powder was calcined in the air at 900° C. for 2 hours. After calcination, wet pulverization was performed in a ball mill for 16 hours, and then dehydration and drying were performed to obtain a solid electrolyte powder. It was confirmed by using an X-ray diffractometer (XRD) that the prepared powder had the same crystal structure as that of the LZP-based NASICON type compound.

(Preparation of Paste for Solid Electrolyte Layer)

The paste for the solid electrolyte layer was prepared by adding 100 parts of ethanol and 200 parts of toluene as a solvent to 100 parts of the solid electrolyte powder and performing wet-mixing in a ball mill, and then by adding 16 parts of a polyvinyl butyral binder and 4.8 parts of benzyl butyl phthalate and performing mixing.

(Preparation of Sheet for Solid Electrolyte Layer)

The paste for the solid electrolyte layer is formed into a sheet by the doctor blade method using the PET film as a base material, and a sheet for the solid electrolyte layer having a thickness of 15 μm was obtained.

(Preparation of Paste for Current Collector Layer)

As a positive electrode current collector and a negative electrode current collector, a paste for the current collector layer was prepared by mixing Cu and lithium vanadium titanium phosphate, which is an active material, such that the volume ratio is 80/20, and then by mixing and dispersing after adding 100 parts of the obtained mixture, 10 parts of ethyl cellulose as a binder, and 50 parts of dihydroterpineol as a solvent.

(Preparation of Base Material for Intermediate Layer)

In preparing the base material for the intermediate layer, lithium vanadium phosphate powder prepared as an active material and the LZP-based NASICON type compound powder prepared with a solid electrolyte are wet-mixed for 16 hours in a ball mill, and the powder obtained after dehydration and drying was calcined at 850° C. for 2 hours in a nitrogen-hydrogen mixed gas. The calcined product was wet-pulverized in a ball mill and then dehydrated and dried to obtain the base powder for the intermediate layer.

(Preparation of Paste for Intermediate Layer)

Regarding the paste for the intermediate layer, the paste for the intermediate layer was prepared by adding 0.5 part of a filler (polyethylene), 15 parts of ethyl cellulose as a binder, and 65 parts of dihydroterpineol as a solvent to 100 parts of the base powder for the intermediate layer, and by performing mixing and dispersing.

(Preparation of External Terminal Paste)

A thermosetting external electrode paste was prepared by mixing and dispersing silver powder, an epoxy resin, and a solvent.

Using these pastes, the all-solid-state battery of Example 1 was prepared as follows.

(Preparation of Positive Electrode Layer Unit)

First, an intermediate layer (referred to as a first positive electrode intermediate layer) having a thickness of 0.2 μm was formed on the sheet for the solid electrolyte layer by screen printing, and dried at 80° C. for 10 minutes. Next, a positive electrode active material layer (referred to as a first positive electrode active material layer) having a thickness of 5 μm was formed on the intermediate layer by screen printing, and dried at 80° C. for 10 minutes. Furthermore, a positive electrode current collector layer having a thickness of 5 μm was formed on the positive electrode current collector layer by screen printing, and dried at 80° C. for 10 minutes. Furthermore, a positive electrode active material layer (referred to as a second positive electrode active material layer) having a thickness of 5 μm was formed again on the positive electrode active material layer by screen printing, and dried at 80° C. for 10 minutes. Furthermore, an intermediate layer (referred to as a second positive electrode intermediate layer) having a thickness of 0.2 is formed again on the positive electrode active material layer by screen printing, and dried at 80° C. for 10 minutes to prepare a positive electrode layer on the sheet for the solid electrolyte layer. Next, a margin layer having a height substantially flush with that of the positive electrode layer was formed on the outer periphery of one end of the positive electrode layer by screen printing, and dried at 80° C. for 10 minutes. Then, the PET film was peeled off to obtain a sheet of the positive electrode layer unit.

(Preparation of Negative Electrode Layer Unit)

Next, an intermediate layer (referred to as a first negative electrode intermediate layer) having a thickness of 0.2 μm was formed on the sheet for the solid electrolyte layer by screen printing, and dried at 80° C. for 10 minutes. Next, a negative electrode active material layer (referred to as a first negative electrode active material layer) having a thickness of 5 μm was formed on the intermediate layer, and dried at 80° C. for 10 minutes. Furthermore, a negative electrode current collector layer having a thickness of 5 μm was formed on the negative electrode active material layer by screen printing, and dried at 80° C. for 10 minutes. Furthermore, a negative electrode active material layer (referred to as a second negative electrode active material layer) having a thickness of 5 μm was formed again on the negative electrode current collector layer by screen printing, and dried at 80° C. for 10 minutes. Furthermore, an intermediate layer (referred to as a second negative electrode intermediate layer) having a thickness of 0.2 μm is formed again on the negative electrode active material layer by screen printing, and dried at 80° C. for 10 minutes to prepare a negative electrode layer on the sheet for the solid electrolyte layer. Next, a margin layer having a height substantially flush with that of the negative electrode layer was formed on the outer periphery of one end of the negative electrode layer by screen printing, and dried at 80° C. for 10 minutes. Then, the PET film was peeled off to obtain a sheet of the negative electrode layer unit.

(Preparation of Laminate)

A plurality of positive electrode layer units and negative electrode layer units were alternately laminated while being offset such that one end of each unit did not coincide with each other, to prepare a laminated substrate. Further, a plurality of solid electrolyte sheets were laminated as outer layers on both main surfaces of the laminated substrate, and an outer layer of 200 μm was provided. This was thermo-compression-bonded by a die press and then cut to prepare a laminate of an unfired all-solid-state battery. Then, the laminate was debound and fired to obtain a laminate of an all-solid-state battery. The laminate is fired by raising the temperature to 1000° C. of the firing temperature in nitrogen at a temperature rise rate of 200° C./hour, maintaining the temperature for 2 hours, and taking out the laminate after natural cooling. The filler became a void, and the major axis length of the void was 0.5 μm, the minor axis length was 0.1 μm, and the aspect ratio was 5.0.

(External Electrode Forming Process)

The end surface of the laminate of the all-solid-state battery was coated with an external terminal paste, and heat curing was performed at 150° C. for 30 minutes to form a pair of external electrodes.

The dimensions of the prepared all-solid-state battery were approximately 4.5 mm×3.2 mm×1.1 mm.

The initial capacity and cycle characteristics of the prepared all-solid-state battery were obtained. The initial capacity and cycle characteristics were determined using a secondary battery charging/discharging test device. The voltage range was from 0.2 V to 2.6 V. First, as a pretreatment, only the first charging was performed with 0.2 C of constant current charging. After this, charging and discharging were performed to obtain the cycle characteristics. Charging was performed with a constant current and a constant voltage. Charging was performed when the current value is 0.2 C, and after reaching 2.6 V, the charging was completed when the current value reached 5% of the current value of 0.2 C. The discharging was performed under the condition of discharging at a current value of 0.1 C. The cycle characteristics were evaluated as the capacity retention rate (%). The capacity retention rate (%) is the ratio of the discharge capacity after 100 cycles to the initial discharge capacity, with the discharge capacity of the first cycle as the initial discharge capacity. The capacity retention rate (%) is expressed by the following formula.

$$\text{Capacity retention rate (\%)} = (\text{"Discharge capacity after 100 cycles"} / \text{"Discharge capacity in first cycle"}) \times 100$$

In addition, the all-solid-state battery after measuring the initial capacity and the like is cut, and the area ratio of the voids in the positive electrode active material layer and the negative electrode active material layer, the ratio of the anisotropic voids in the voids, the shape of the anisotropic voids, the orientation direction of the anisotropic void, and the area ratio of the voids in the intermediate layer were obtained.

Examples 2 to 6

The difference from Example 1 is that the major axis length and the minor axis length of the void are changed under the condition that the aspect ratio is constant. The aspect ratio was 5.0, which was the same as that in Example 1. The major axis length, the minor axis length, and the aspect ratio of the voids were adjusted by the shape of the filler added to the paste of the positive electrode active material layer and the negative electrode active material layer. In Examples 2 to 6, the same measurement as that in Example 1 was performed.

Examples 7 to 12

The difference from Example 1 is that the major axis length and the minor axis length of the void are changed. The major axis length, the minor axis length, and the aspect ratio of the voids were adjusted by the shape of the filler added to the paste of the positive electrode active material layer and the negative electrode active material layer. In Examples 7 to 12, the same measurement as that in Example 1 was performed.

Examples 13 to 18

The difference from Example 1 is that the minor axis length of the void is constant and the major axis length and the aspect ratio of the void are changed. The major axis length and the aspect ratio of the void were adjusted by the shape of the filler added to the paste of the positive electrode active material layer and the negative electrode active material layer. In Examples 13 to 18, the same measurement as that in Example 1 was performed.

Example 19

When preparing the paste for the positive electrode active material layer and the negative electrode active material layer using a filler having a major axis length of 12.5 μm and a minor axis length of 1.1 μm, no mesh was used. Other conditions were the same as those in Example 1. The anisotropic voids of Example 19 were not particularly oriented in a predetermined direction, and the direction of the major axis in each anisotropic void was random. In Example 19, the same measurement as that in Example 1 was performed.

Examples 20 to 24

Using a filler having a major axis length of 12.5 μm and a minor axis length of 1.1 μm, the composition ratio of the active material particles and the filler in the paste of the positive electrode active material layer and the negative electrode active material layer was changed. Other conditions were the same as those in Example 1. In Examples 20 to 24, the same measurement as that in Example 1 was performed.

Examples 25 to 28

Two types of fillers, that is, a filler having shape anisotropy and a filler not having shape anisotropy, were used, and the mixing ratio of these was changed. The major axis length of the filler having shape anisotropy was 12.5 μm, and the minor axis length was 1.1 μm. Other conditions were the same as those in Example 1. In Examples 25 to 28, the same measurement as that in Example 1 was performed.

Example 29

The difference from Example 21 is that the amount of the filler added to the intermediate layer is changed and the porosity of the intermediate layer is changed. Other conditions were the same as those in Example 21.

Comparative Example 1

The difference from Example 1 is that a filler having a major axis length of 0.3 μm, a minor axis length of 0.3 μm, and an aspect ratio of 1.0 is used. Other conditions were the same as those in Example 1.

Comparative Example 2

The difference from Example 1 is that a filler having a major axis length of 1.3 μm, a minor axis length of 1.3 μm, and an aspect ratio of 1.0 is used. Other conditions were the same as those in Example 1.

Comparative Example 3

The difference from Example 1 is that a filler having a major axis length of 1.8 μm, a minor axis length of 1.1 μm, and an aspect ratio of 1.6 is used. Other conditions were the same as those in Example 1.

Comparative Example 4

The difference from Example 1 is that a filler having a major axis length of 35.9 μm, a minor axis length of 1.1 μm, and an aspect ratio of 31.9 is used. Other conditions were the same as those in Example 1.

Examples 1-2 to 22-2

The all-solid-state battery having a plurality of voids inside all of the side margin layers was prepared as Example 1-2, Example 19-2, Example 20-2, Example 20-3, Example 20-4, and Example 22-2. Regarding other conditions, Example 1-2 was the same as Example 1, Example 19-2 was the same as Example 19, Examples 20-2 to 20-4 were the same as Example 20, and Example 22-4 was the same as Example 22. Further, the side margin layers of the all-solid-state batteries of Examples 1-2, Example 19-2, Example 20-2, Example 20-3, Example 20-4, and Example 22-2 have voids having the same configurations as those of the positive electrode active material layer and the negative electrode active material layer, except for the porosity, at the same proportions as those in Example 1, Example 19, Example 20, and Example 22, respectively. In addition, in Example 1-2, Example 19-2, Example 20-2, Example 20-3, Example 20-4, and Example 22-2, the porosity of the side margin layer was adjusted to be different from those in Example 1, Example 19, Example 20, and Example 22, respectively. In Example 1, Example 19, Example 20, and Example 22, the porosity of the side margin layer was less than 2%. In Table 2, the porosity of the side margin layer is added in Example 1, Example 19, Example 20, and Example 22 of Table 1, and Example 1-1, Example 19-1, Example 20-1, and Example 22-1 are described. The same measurements as those in Example 1 were performed in Example 1-2, Example 19-2, Example 20-2, Example 20-3, Example 20-4, and Example 22-2, and further, the porosity of the side margin layer was measured.

Examples 101 to 128

As Examples 101 to 128, all-solid-state batteries were prepared without the process of forming the intermediate layer. In other words, the all-solid-state batteries of Examples 101 to 128 do not have an intermediate layer. Regarding other conditions, Examples 101 to 128 were the same as those of Examples 1 to 28, respectively.

Comparative Examples 11 to 14

As Comparative Examples 11 to 14, all-solid-state batteries were prepared without the process of forming the intermediate layer. In other words, the all-solid-state batteries of Comparative Examples 11 to 14 do not have an intermediate layer. Regarding other conditions, Comparative Examples 11 to 14 were the same as those of Comparative Examples 1 to 4, respectively.

The results of measuring the initial capacity, the cycle characteristics, the area ratio of the voids, the ratio of the anisotropic voids in the voids, the shape of the anisotropic voids, and the orientation direction of the anisotropic voids are shown in Tables 1 to 3 below. In addition, in Table 1 to Table 3, the initial capacity shows the ratio when the initial capacity of Example 1 is set to 100%. Table 3 shows the results of Examples 101 to 128 and Comparative Examples 11 to 14. The all-solid-state batteries of Examples 101 to 128 and Comparative Examples 11 to 14 do not have an intermediate layer. Therefore, in the all-solid-state batteries of Examples 101 to 128 and Comparative Examples 11 to 14, the area ratio of the voids in the intermediate layer was not measured.

TABLE 1

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Initial capacity | Cycle characteristics |
|---|---|---|---|---|---|---|---|---|---|
| Example 1 | 0.5 | 0.1 | 5.0 | Within xy plane | 9% | 80% | 4% | 100% | 58% |
| Example 2 | 1.0 | 0.2 | 5.0 | Within xy plane | 9% | 80% | 4% | 100% | 67% |
| Example 3 | 2.0 | 0.4 | 5.0 | Within xy plane | 9% | 80% | 4% | 99% | 75% |
| Example 4 | 4.5 | 0.9 | 5.0 | Within xy plane | 9% | 80% | 4% | 100% | 86% |
| Example 5 | 11.0 | 2.2 | 5.0 | Within xy plane | 9% | 80% | 4% | 100% | 87% |
| Example 6 | 25.0 | 5.0 | 5.0 | Within xy plane | 9% | 80% | 4% | 99% | 76% |
| Examp 7 | 8.1 | 1.0 | 8.1 | Within xy plane | 9% | 80% | 4% | 100% | 91% |
| Example 8 | 15.5 | 1.9 | 8.3 | Within xy plane | 9% | 80% | 4% | 100% | 82% |
| Example 9 | 24.0 | 3.2 | 7.5 | Within xy plane | 9% | 80% | 4% | 100% | 74% |
| Examp 10 | 38.9 | 4.7 | 8.3 | Within xy plane | 9% | 80% | 4% | 101% | 63% |
| Example 11 | 45.0 | 5.5 | 8.2 | Within xy plane | 9% | 80% | 4% | 100% | 58% |
| Example 12 | 0.2 | 0.1 | 2.0 | Within xy plane | 9% | 80% | 4% | 100% | 60% |
| Example 13 | 1.8 | 0.9 | 2.0 | Within xy plane | 9% | 80% | 4% | 100% | 68% |
| Example 14 | 4.8 | 0.9 | 5.3 | Within xy plane | 9% | 80% | 4% | 101% | 80% |
| Examp 15 | 8.1 | 0.9 | 9.0 | Within xy plane | 9% | 80% | 4% | 100% | 86% |
| Example 16 | 14.0 | 0.9 | 15.6 | Within xy plane | 9% | 80% | 4% | 100% | 80% |

TABLE 1-continued

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Initial capacity | Cycle characteristics |
|---|---|---|---|---|---|---|---|---|---|
| Example 17 | 22.1 | 0.9 | 24.6 | Within xy plane | 9% | 80% | 4% | 99% | 72% |
| Example 18 | 26.0 | 0.9 | 28.9 | Within xy plane | 9% | 80% | 4% | 100% | 60% |
| Example 19 | 10.0 | 0.9 | 11.1 | Random | 9% | 80% | 4% | 99% | 66% |
| Examp 20 | 10.0 | 0.9 | 11.1 | Within xy plane | 2% | 80% | 4% | 110% | 60% |
| Example 21 | 10.0 | 0.9 | 11.1 | Within xy plane | 3% | 80% | 4% | 109% | 76% |
| Example 22 | 10.0 | 0.9 | 11.1 | Within xy plane | 9% | 80% | 4% | 100% | 88% |
| Example 23 | 10.0 | 0.9 | 11.1 | Within xy plane | 30% | 80% | 4% | 80% | 87% |
| Example 24 | 10.0 | 0.9 | 11.1 | Within xy plane | 35% | 80% | 4% | 72% | 85% |
| Example 25 | 10.0 | 0.9 | 11.1 | Within xy plane | 9% | 5% | 4% | 98% | 58% |
| Example 26 | 10.0 | 0.9 | 11.1 | Within xy plane | 9% | 10% | 4% | 99% | 61% |
| Example 27 | 10.0 | 0.9 | 11.1 | Within xy plane | 9% | 30% | 4% | 99% | 71% |
| Example 28 | 10.0 | 0.9 | 11.1 | Within xy plane | 9% | 50% | 4% | 100% | 80% |
| Examp 29 | 10.0 | 0.9 | 11.1 | Within xy plane | 3% | 80% | 10% | 109% | 67% |
| Comparative 1 | 0.2 | 0.2 | 1.0 | — | 3% | 0% | 4% | 113% | 41% |
| Comparative Example 2 | 1.0 | 1.0 | 1.0 | — | 9% | 0% | 4% | 100% | 49% |
| Comparative Example 3 | 1.4 | 0.9 | 1.6 | Within xy plane | 9% | 80% | 4% | 100% | 55% |
| Comparative Example 4 | 28.7 | 0.9 | 31.9 | Within xy plane | 9% | 80% | 4% | 100% | 47% |

TABLE 2

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Porosity of side margin layer | Initial capacity | Cycle characteristics |
|---|---|---|---|---|---|---|---|---|---|---|
| Example 1-1 | 0.5 | 0.1 | 5.0 | Within xy plane | 9% | 80% | 4% | Less than 2% | 100% | 58% |
| Example 1-2 | 0.5 | 0.1 | 5.0 | Within xy plane | 9% | 80% | 4% | 5% | 100% | 60% |
| Example 19-1 | 10.0 | 0.9 | 11.1 | Random | 9% | 80% | 4% | Less than 2% | 99% | 66% |

TABLE 2-continued

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Porosity of side margin layer | Initial capacity | Cycle characteristics |
|---|---|---|---|---|---|---|---|---|---|---|
| Example 19-2 | 10.0 | 0.9 | 11.1 | Random | 9% | 80% | 4% | 5% | 99% | 69% |
| Example 20-1 | 10.0 | 0.9 | 11.1 | Within xy plane | 2% | 80% | 4% | Less than 2% | 110% | 60% |
| Example 20-2 | 10.0 | 0.9 | 11.1 | Within xy plane | 2% | 80% | 4% | 3% | 110% | 62% |
| Example 20-3 | 10.0 | 0.9 | 11.1 | Within xy plane | 2% | 80% | 4% | 6% | 110% | 64% |
| Example 20-4 | 10.0 | 0.9 | 11.1 | Within xy plane | 2% | 80% | 4% | 8% | 110% | 65% |
| Example 22-1 | 10.0 | 0.9 | 11.1 | Within xy plane | 9% | 80% | 4% | Less than 2% | 100% | 88% |
| Example 22-2 | 10.0 | 0.9 | 11.1 | Within xy plane | 9% | 80% | 4% | 5% | 100% | 91% |

TABLE 3

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Initial capacity | Cycle characteristics |
|---|---|---|---|---|---|---|---|---|---|
| Example 101 | 0.5 | 0.1 | 5.0 | Within xy plane | 9% | 80% | — | 102% | 51% |
| Example 102 | 1.0 | 0.2 | 5.0 | Within xy plane | 9% | 80% | — | 99% | 64% |
| Example 103 | 2.0 | 0.4 | 5.0 | Within xy plane | 9% | 80% | — | 100% | 71% |
| Example 104 | 4.5 | 0.9 | 5.0 | Within xy plane | 9% | 80% | — | 99% | 75% |
| Example 105 | 11.0 | 2.2 | 5.0 | Within xy plane | 9% | 80% | — | 99% | 77% |
| Example 106 | 25.0 | 5.0 | 5.0 | Within xy plane | 9% | 80% | — | 100% | 70% |
| Example 107 | 8.1 | 1.0 | 8.1 | Within xy plane | 9% | 80% | — | 101% | 81% |
| Example 108 | 15.5 | 1.9 | 8.3 | Within xy plane | 9% | 80% | — | 98% | 72% |
| Example 109 | 24.0 | 3.2 | 7.5 | Within xy plane | 9% | 80% | — | 101% | 67% |
| Example 110 | 38.9 | 4.7 | 8.3 | Within xy plane | 9% | 80% | — | 100% | 57% |
| Example 111 | 45.0 | 5.5 | 8.2 | Within xy plane | 9% | 80% | — | 102% | 49% |
| Example 112 | 0.2 | 0.1 | 2.0 | Within xy plane | 9% | 80% | — | 101% | 50% |
| Example 113 | 1.8 | 0.9 | 2.0 | Within xy plane | 9% | 80% | — | 102% | 60% |

TABLE 3-continued

| | Major axis length of anisotropic void (μm) | Minor axis length of anisotropic void (μm) | Aspect ratio | Orientation direction | Porosity | Ratio of anisotropic void with respect to all voids | Porosity of intermediate layer | Initial capacity | Cycle characteristics |
|---|---|---|---|---|---|---|---|---|---|
| Example 114 | 4.8 | 0.9 | 5.3 | Within xy plane | 9% | 80% | — | 99% | 73% |
| Example 115 | 8.1 | 0.9 | 9.0 | Within xy plane | 9% | 80% | — | 100% | 77% |
| Example 116 | 14.0 | 0.9 | 15.6 | Within xy plane | 9% | 80% | — | 102% | 71% |
| Example 117 | 22.1 | 0.9 | 24.6 | Within xy plane | 9% | 80% | — | 101% | 62% |
| Example 118 | 26.0 | 0.9 | 28.9 | Within xy plane | 9% | 80% | — | 101% | 55% |
| Example 119 | 10.0 | 0.9 | 11.1 | Random | 9% | 80% | — | 99% | 62% |
| Example 120 | 10.0 | 0.9 | 11.1 | Within xy plane | 2% | 80% | — | 111% | 56% |
| Example 121 | 10.0 | 0.9 | 11.1 | Within xy plane | 3% | 80% | — | 109% | 65% |
| Example 122 | 10.0 | 0.9 | 11.1 | Within xy plane | 9% | 80% | — | 99% | 79% |
| Example 123 | 10.0 | 0.9 | 11.1 | Within xy plane | 30% | 80% | — | 78% | 76% |
| Example 124 | 10.0 | 0.9 | 11.1 | Within xy plane | 35% | 80% | — | 72% | 74% |
| Example 125 | 10.0 | 0.9 | 11.1 | Within xy plane | 9% | 5% | — | 98% | 50% |
| Example 126 | 10.0 | 0.9 | 11.1 | Within xy plane | 9% | 10% | — | 99% | 53% |
| Example 127 | 10.0 | 0.9 | 11.1 | Within xy plane | 9% | 30% | — | 98% | 65% |
| Example 128 | 10.0 | 0.9 | 11.1 | Within xy plane | 9% | 50% | — | 99% | 72% |
| Comparative Example 11 | 0.2 | 0.2 | 1.0 | — | 3% | 0% | — | 108% | 38% |
| Comparative Example 12 | 1.0 | 1.0 | 1.0 | — | 9% | 0% | — | 113% | 45% |
| Comparative Example 13 | 1.4 | 0.9 | 1.6 | Within xy plane | 9% | 80% | — | 101% | 48% |
| Comparative Example 14 | 28.7 | 0.9 | 31.9 | Within xy plane | 9% | 80% | — | 100% | 44% |

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
4 Laminate
5 First external terminal
6 Second external terminal
V, V2 Plurality of voids
V1 Anisotropic void

The invention claimed is:

1. An all-solid-state battery comprising:
a positive electrode layer, a negative electrode layer, and a solid electrolyte layer positioned between the positive electrode layer and the negative electrode layer, and a plurality of side margin layers disposed on the outer periphery along the positive electrode layer and the negative electrode layer, wherein the positive electrode layer includes a positive electrode current collector and a positive electrode active material layer which is in contact with the positive electrode current collector, the negative electrode layer includes a negative electrode current collector and a negative electrode active material layer which is in contact with the negative electrode current collector, at least one of the positive electrode active material layer and the negative electrode active material layer is a layer in which a plurality of voids are formed, and the plurality of voids in the at least one of the positive electrode active layer and the negative electrode active material layer include anisotropic voids in which an aspect ratio obtained by dividing a length in a major axis direction by a length in a minor axis direction is 2 or more and 29 or less, wherein the side margin layer contains a solid electrolyte, and wherein the plurality of the side margin layers is a regin in which a plurality of voids are formed, and the plurality of voids in the plurality of side margin layers include an antisotropic void in which the aspect ration obtained by dividing the length in the major axis direction by the length in the minor axis direction is 2 or more and 29 or less, wherein an intermediate layer having ionic conductivity is provided between at least one of the positive and negative electrode layers and the solid electrolyte layer, the intermediate layer is a layer in which a plurality of voids are formed and which has a composition between the active material that forms the positive electrode active material layer or the negative electrode active material layer and the solid electrolyte that forms the solid electrolyte layer, and a ratio of the plurality of voids in the intermediate layer is 0.1% or more and 8% or less.

2. The all-solid-state battery according to claim 1, wherein 30% or more of the plurality of voids are the anisotropic voids.

3. The all-solid-state battery according to claim 1, wherein the major axis direction of the anisotropic void substantially coincides with an in-plane direction in which the positive electrode active material layer or the negative electrode active material layer spreads.

4. The all-solid-state battery according to claim 1, wherein an average length of the anisotropic void in the major axis direction is 0.2 μm or more and 40 μm or less, and the average length of the anisotropic void in the minor axis direction is 0.1 μm or more and 5 μm or less.

5. The all-solid-state battery according to claim 1, wherein a ratio of the plurality of voids in the positive electrode active material layer or the negative electrode active material layer is 3% or more and 30% or less.

6. The all-solid-state battery according to claim 1, wherein the positive electrode active material layer and the negative electrode active material layer is lithium vanadium phosphate, the solid electrolyte is lithium zirconium phosphate, and the intermediate layer is lithium zirconium phosphate containing vanadium or lithium vanadium phosphate containing zirconium.

7. The all-solid-state battery according to claim 1, wherein a ratio of the plurality of voids in the intermediate layer is 4% or more and 8% or less.

* * * * *